(12) United States Patent
Baraff

(10) Patent No.: US 7,884,826 B1
(45) Date of Patent: Feb. 8, 2011

(54) MAINTAINING THE GROOM

(75) Inventor: David Baraff, Oakland, CA (US)

(73) Assignee: Pixar, Emeryville, CA (US)

(\*) Notice: Subject to any disclaimer, the term of this patent is extended or adjusted under 35 U.S.C. 154(b) by 630 days.

(21) Appl. No.: 11/753,891

(22) Filed: May 25, 2007

Related U.S. Application Data

(60) Provisional application No. 60/812,519, filed on Jun. 8, 2006.

(51) Int. Cl.
*G06T 15/70* (2006.01)

(52) U.S. Cl. ........................ 345/473; 345/474

(58) Field of Classification Search ........................ None
See application file for complete search history.

(56) References Cited

U.S. PATENT DOCUMENTS

| | | | | |
|---|---|---|---|---|
| 5,404,426 | A * | 4/1995 | Usami et al. | 345/420 |
| 5,777,619 | A * | 7/1998 | Brinsmead | 345/419 |
| 6,559,849 | B1 * | 5/2003 | Anderson et al. | 345/474 |
| 7,609,261 | B2 * | 10/2009 | Gibbs et al. | 345/419 |
| 2005/0210994 | A1 * | 9/2005 | Petrovic et al. | 73/760 |
| 2005/0212800 | A1 * | 9/2005 | Petrovic et al. | 345/426 |
| 2006/0158453 | A1 * | 7/2006 | Bruderlin et al. | 345/582 |
| 2006/0224366 | A1 * | 10/2006 | Choe et al. | 703/2 |

OTHER PUBLICATIONS

D.-W. Lee and H.-S. Ko, "Natural Hairstyle Modeling and Animation," Graphical Models, vol. 63, No. 2, pp. 67-85, Mar. 2001.*
Hadap, S., and Magnenat-Thalmann, N. 2001. Modeling Dynamic Hair as a Continuum. Comput. Graph. Forum 2001.*
Ward K., Galoppo N., Lin M. C.: Modeling hair influenced by water and styling products. In Proc. of Computer Animation and Social Agents (2004).*

\* cited by examiner

*Primary Examiner*—Daniel F Hajnik
(74) *Attorney, Agent, or Firm*—Townsend and Townsend and Crew LLP

(57) ABSTRACT

Methods and apparatus are disclosure for maintaining realistic grooming of simulated objects. In a method for simulating objects, a reference shape associated with a simulated object is received. A predetermined orientation is also received. A force acting on the simulated object is then modified based on the predetermined orientation. The force acts on the simulated object to shape the simulated object according to the reference shape. The force may be "strategically weakened" when the simulated object (or a portion thereof) is substantially aligned with the predetermined orientation. In a further method for simulating objects, a measured height associated with the simulated object is received. A "lifting" force is generated to reduce a difference between the measured height and a predetermined height associated with the reference shape. The lifting force simulates structure and internal forces that provide volume and shaping to physical objects, such as hair.

36 Claims, 4 Drawing Sheets

MAINTAINING THE GROOM

CROSS-REFERENCES TO RELATED APPLICATIONS

This application claims the benefit of and priority of U.S. Provisional Patent Application No. 60/812,519, filed Jun. 8, 2006 and entitled "Simulating Physical Properties of Objects Posed by Animators," the entire disclosure of which is herein incorporated by reference for all purposes.

BACKGROUND OF THE INVENTION

The present invention relates to computer animation. More specifically, the present invention relates to methods and apparatus for realistic grooming of simulating objects in computer animation.

In computer graphics imagery, motions and positions of secondary objects, such as hair, clothing, and plants are usually too complex for a human animator to directly control at every stage of a computer animation. Instead, animator specifies physical properties of the secondary or simulated objects for use by a computer program. The computer program then uses physically-based numerical methods and techniques to simulate the motions and positions of the secondary objects over time based on their physical properties.

For simulated clothing objects, the animator specifies the physical properties of the hair, such as how the hair bends due to forces or collisions with solid objects and how the hair deforms or collides with itself. The human animator also specifies spring or torsion forces that act on the hair that attempt to preserve the hair in the posed shape during simulation. The human animator may specify external forces acting on the hair, such as gravity and wind.

The animator also specifies motions and positions of kinematic or non-simulated objects (e.g., characters upon which the clothing objects rest). The animation of a non-simulated object is independent of and otherwise unaffected by motions and positions of simulated objects. However, the motions and positions of the non-simulated objects often principally influence motions and positions of simulated objects that are associated with the non-simulated object.

Consider a computer animation of a human character, having a hair style groomed by a human animator. The human character (i.e., the kinematic object) is directly animated by the skilled human animator. The hair of the human character is also posed or groomed to a desired shape and style. Then the computer program simulates motion of the hair (i.e., the simulated object) using physically-based numerical techniques.

However, problems exists with physically-based numerical methods and techniques used in computer animations where simulated objects (e.g., the primary characters of a scene) are posed in a particular shape. In the real world, hair usually sits on top of other hair that influences the shape and motion of the hair on top. If the physical properties and external forces acting on a simulated object are accurately modeled, the resulting motion of the simulated object will be plausible and seemingly realistic. However, it is too complex for a human animator to model every hair on the human head.

In our hair example, the animator models enough of the hair of the human character to achieve the desired hair groom. One problem is that the forces that hold the groom will prevent the hair from hanging down and moving naturally according to the motions of the non-simulated human character. This results in the hair remaining in the posed shape, and looking plastic or unrealistic.

Accordingly, what is desired are improved methods and apparatus for simulating physical properties of objects posed by an animator in a computer animation without the drawbacks discussed above.

BRIEF SUMMARY OF THE INVENTION

The present invention relates to computer animation. More specifically, the present invention relates to methods and apparatus for realistic grooming of simulating objects in computer animation.

In various embodiment, a method for simulating objects includes receiving a reference shape associated with a simulated object. A predetermined orientation is also received. A force acting on the simulated object is modified based on the predetermined orientation. The force acts on the simulated object to shape the simulated object according to the reference shape.

In some embodiments, modifying the first force based on the predetermined orientation includes relaxing the first force when a portion of the simulated object is substantially aligned with the predetermined orientation. Modifying the first force based on the predetermined orientation may include weakening the first force based in response to a difference between a measured orientation of the simulated object and the predetermined orientation. Modifying the first force may include adjusting a spring constant associated with a torsion force.

The predetermined orientation may be relative to a gravitational force. The predetermined orientation may also be relative to local acceleration. In one embodiment, the predetermined orientation is substantially vertical.

In various embodiments, a measured height associated with the simulated object is received. A force is generated to reduce a difference between the measured height and a predetermined height associated with the reference shape when the measured height is less than the predetermined height. The second force may act on the simulated object to move a current height associated with the simulated object toward the predetermined height. In further embodiments, the measured height associated with the simulated object is determined relative to a portion of the simulated object.

The simulated object may be a hair object. The simulated object may include a linear object.

In some embodiments, a computer program product is stored on a computer readable medium for simulating objects. The computer program product includes code for receiving a reference shape associated with a simulated object, code for receiving a predetermined orientation, and code for modifying a first force acting on the simulated object based on the predetermined orientation, the first force acting on the simulated object to shape the simulated object according to the reference shape.

In various embodiments, a system for simulating objects includes a processor and a memory. The memory is coupled to the processor and configured to store a set of instructions which when executed by the processor configure the processor to receive a reference shape associated with a simulated object, receive a predetermined orientation, and modify a first force acting on the simulated object based on the predetermined orientation, the first force acting on the simulated object to shape the simulated object according to the reference shape.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

The present invention relates to computer animation. More specifically, the present invention relates to methods and apparatus for realistic grooming of simulating objects in computer animation.

In various embodiments, simulated objects are elements of a computer animation display. The computer animation display may include simulated objects (e.g., secondary or dynamic object) such as cloth, garments and clothing, hair, and fur. The computer animation display may further include reference objects (e.g., kinematic, non-simulated objects, or other simulated objects), such as characters and/or collision objects.

Typically, simulated objects are model, described, or represented as a collection of particles, connected to each other in some manner. In one example, a topological mesh is used in the case of clothing. In another example, a collection of strands or linear objects are used to describe hair or fur. According to various embodiments, techniques are provided that allow a simulation computer program to better display in visually desirable manners simulated objects that response to changes in motions and positions of reference or non-simulated objects.

In some embodiments, the simulation computer program modifies forces acting on a simulated object that attempt to maintain or enforce a reference shape associated with the simulated object. The reference shape may be provided by or posed by an animator. The simulation computer program modifies the forces based on orientation of the simulated object. For example, when the simulated object (or a portion thereof) is substantially aligned in a predetermined orientation, the simulation computer program may weaken or relax the forces that attempt to maintain or enforce the shape associated with the simulated object. Thus, forces acting on portions of a hair object that have been groomed by an animator may be strategically weakened by the simulation computer program to allow the portions to hang down and freely move as if being influenced by gravity. This "strategic weakening" maintains or preserves the overall groom or pose established by an animator, while allowing portions of the groom to be modified based on their orientation.

In further embodiments, a simulation computer program generates forces to act on a simulated object to reduce a difference between a reference shape and a measured recurrent shape associated with the simulated object. For example, a reference shape may establish a predetermined height at which a hair groom has been posed by an animator. The simulation computer program may generates forces to lift portions of the hair groom that may be drooping or dragged down due to external forces such as gravity. This "z-lofting" provides substance to simulated objects, like in the real world, such as where hair usually sits on top of other hair that influences the shape and motion of the hair on top.

Figure 1:
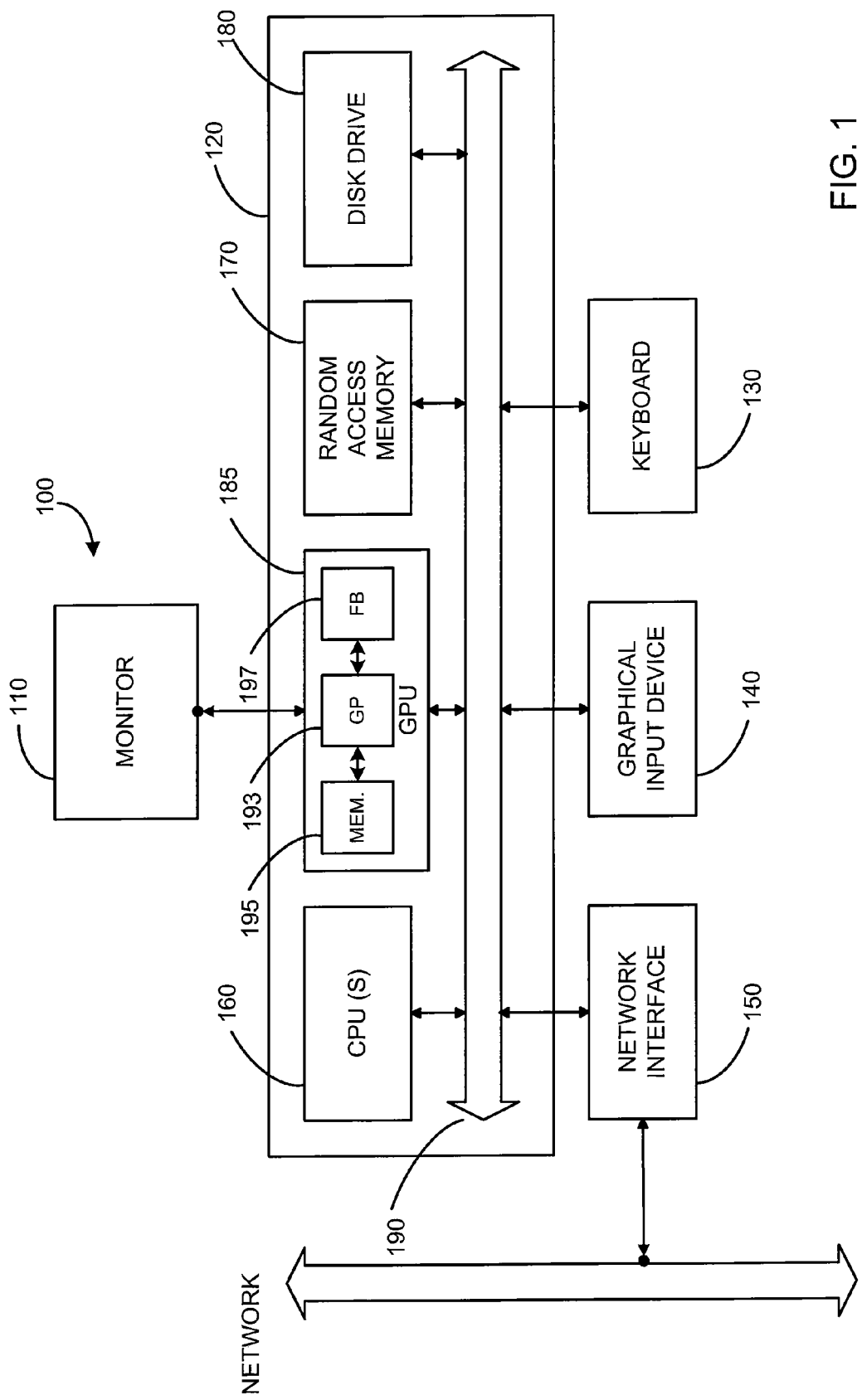
FIG. 1 is a block diagram of a computer system that may be used to practice embodiments of the present invention.

FIG. 1 is a block diagram of a computer system 100 that may be used to practice embodiments of the present invention.

In one embodiment, computer system 100 typically includes a monitor 110, computer 120, a keyboard 130, a user input device 140, computer interfaces 150, and the like.

In various embodiments, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, and may be a software program, such as soft DSL, or the like.

In various embodiments, computer 120 typically includes familiar computer components such as a processor 160, and memory storage devices, such as a random access memory (RAM) 170, disk drives 180, a GPU 185, and system bus 190 interconnecting the above components.

In some embodiment, computer 120 includes one or more Xeon microprocessors from Intel. Further, one embodiment, computer 120 includes a UNIX-based operating system.

RAM 170 and disk drive 180 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 185 may be any conventional graphics processing unit that may be user programmable. Such GPUs are available from NVIDIA, ATI, and other vendors. In this example, GPU 185 includes a graphics processor 193, a number of memories and/or registers 195, and a number of frame buffers 197.

FIG. 1 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxillary processing board.

In various embodiments, computer system 100 allows an animator to preserve or maintain the shape or groom of simulated objects, such as cloth and hair, to provide visually appealing animations.

Consider again the computer animation of a human character (i.e., the kinematic object), having a hair style (i.e., a simulated object) groomed by a human animator. The human character is directly animated by the skilled human animator. The hair of the human character is also posed or groomed to a desired shape and style.

In our hair example, the animator models enough of the hair of the human character to achieve the desired hair groom. Typically, the forces that hold the groom will prevent the hair from hanging down and moving naturally according to the motions of the non-simulated human character. This results in the hair remaining in the posed shape, and looking plastic or unrealistic.

Figure 2:
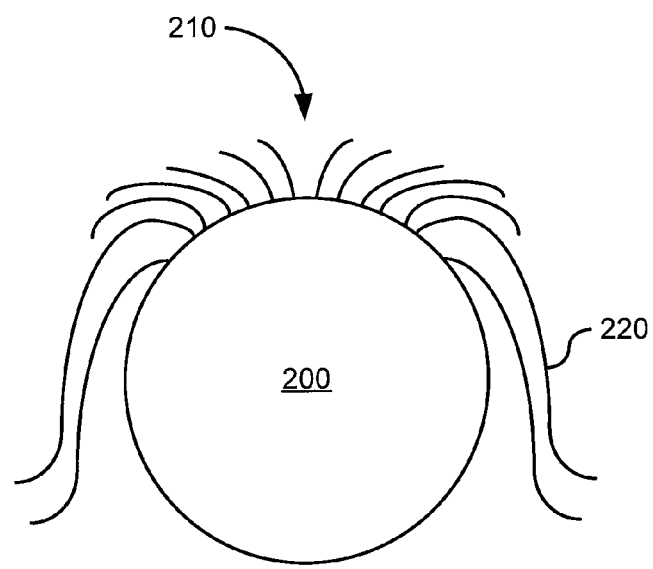
FIG. 2 is a simplified illustration of a non-simulated character's head including simulated hair as posed or groomed by an animator in one embodiment according to the present invention.

FIG. 2 is a simplified illustration of a non-simulated character's head 200 including simulated hair 210 as posed or groomed by an animator in one embodiment according to the present invention. In this example, simulated hair object 210 includes a single strand of hair 220. Hair 220 may be a linear object. A linear object is any object whose import motion is defined by a line.

Figure 3:
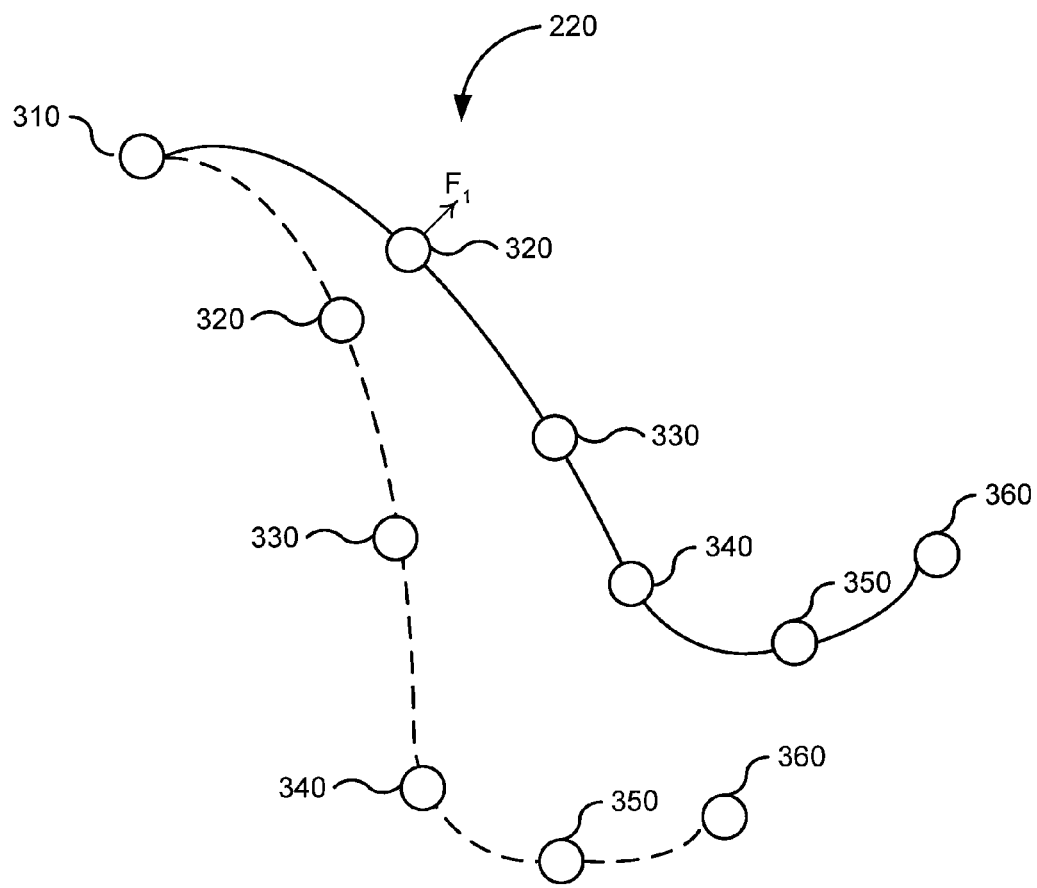
FIG. 3 is an illustration of set of particles forming a single hair associated with the simulated hair of FIG. 2 depicting position of the single hair as posed and position of the single hair during simulation in one embodiment according to the present invention.

FIG. 3 is an illustration of set of particles forming single hair 220 associated with simulated hair 210 of FIG. 2 depicting position of single hair 220 as posed and position of the single hair during simulation in one embodiment according to the present invention. In this example, single hair 220 includes a root particle 310, and hair particles 320, 330, 340, 350, and 360.

FIG. 3 depicts shape and position of single hair 220 as posed by the animator from root particle 310 through the hair particles 320, 330, 340, 350, and 360 using a solid line. The animator may specify one or more forces (e.g., force $F_1$), such as spring forces or constraints, to act on root particle 310, and each of hair particles 320, 330, 340, 350, and 360 that specify position at pose-time of single hair 220. In one example, the animator specifies torsion or angular forces at the particle 340 that create the shape of a portion of hair object 210 between hair particles 330, 340, and 350.

FIG. 3 further depicts shape and position of single hair 220 during simulation from root particle 310 through the hair particles 320, 330, 340, 350, and 360 using a dashed line. In this example, simulation forces such as gravity and motions of reference or non-simulated objects (e.g., character head 200), and physical properties of hair object 210, such as mass and rigidity, cause single hair 220 to droop or fall below the positions as posed by the animator. Furthermore, the shape of single hair 220 may be different.

In various embodiments, computer system 100 provides that when a portion of hair object 210, such as that between hair particles 330, 340, and 350 of single hair 220 is substantially aligned in a predetermined orientation or direction (e.g., the vertical direction), computer system 100 relaxes one or more forces (e.g., force $F_1$) acting on hair particles 330, 340, and 350 that attempt to move single hair 220 toward the reference shape (and position) established at pose-time. This "strategic weakening" of the one or more forces provides visually pleasing freedom of motion for hair object 210 for those portions aligned with the predetermined orientation while maintaining the groom provided by the animator.

Figure 4:
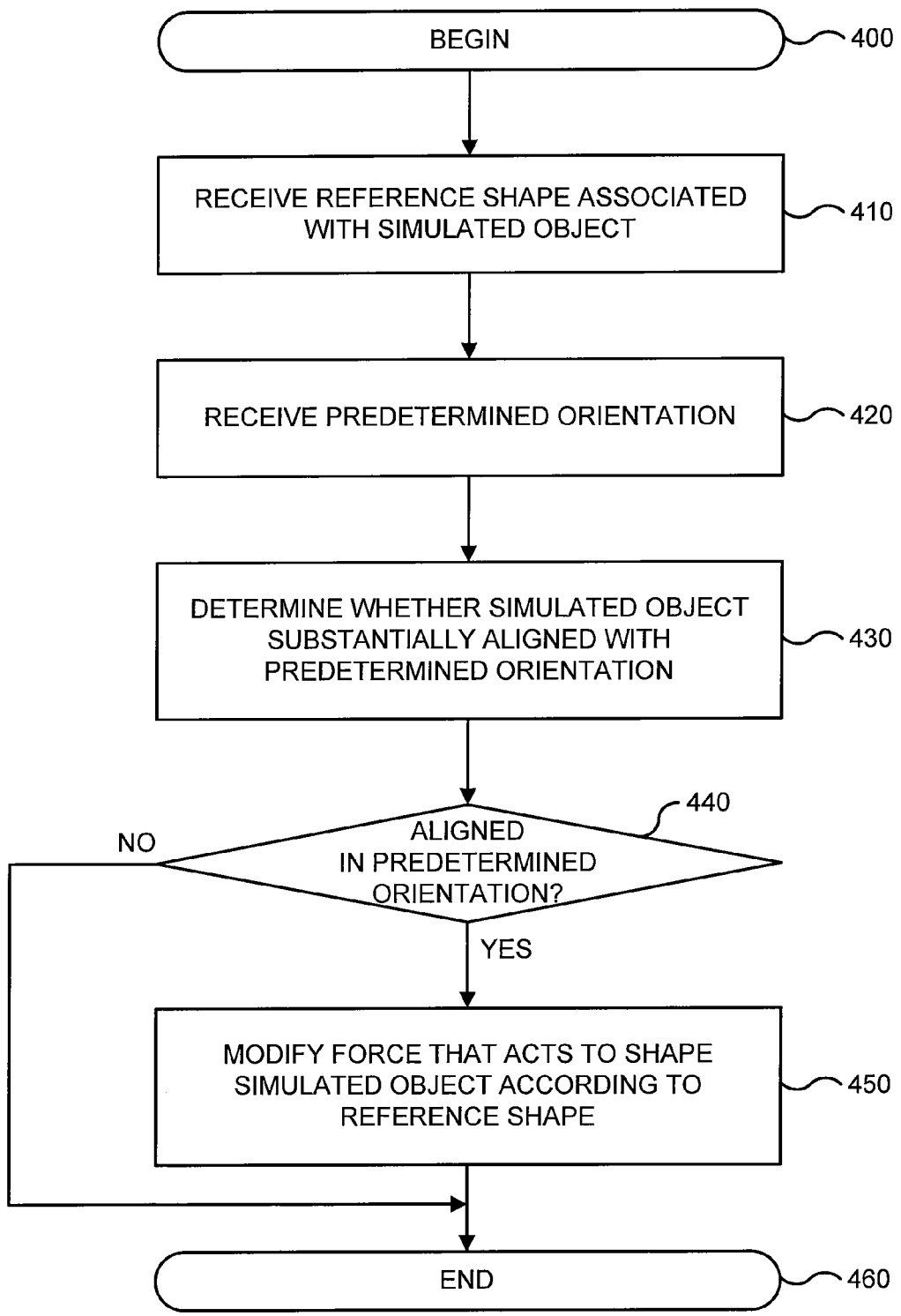
FIG. 4 is a simplified flowchart of a method for simulating objects posed by an animator using strategic weakening in one embodiment according to the present invention.

FIG. 4 is a simplified flowchart of a method for simulating objects posed by an animator using strategic weakening in one embodiment according to the present invention. The processing depicted in FIG. 4 may be performed by software modules (e.g., instructions or code) executed by a processor of a computer system, by hardware modules of the computer system, or combinations thereof. FIG. 4 begins in step 400.

In step 410, computer system 100 receives a reference shape associated with a simulated object. For example, computer system 100 receives position of hair particles 310, 320, 330, 340, 350, and 360 of FIG. 3 as posed by the animator (indicated by the solid black line). Computer system 100 further may receive information, such as tensions, torsion forces, spring constants, and the like, that defines how single hair 220 maintains its shape as posed by the animator.

In step 420, computer system 100 receives a predetermined orientation. The predetermined orientation may be a direction, such as horizontal or vertical. The predetermined orientation may also be an orientation relative to a gravitational force, an orientation relative to a local acceleration, and the like.

In step 430, computer system 100 determines whether the simulated object is substantially aligned with the predetermined orientation. In step 440, if the simulated object (or a portion thereof) is aligned with the predetermined orientation, in step 430, computer system 100 modifies a force that acts to shape the simulated object according to the reference shape.

For example, computer system 100 may adjust a modify spring constants related to torsion forces. In another example, computer system 100 may relax or weaken one or more forces that attempt to move the simulated object into or toward the reference shape. In yet another example, computer system 100 may adjust animation variables associated with the simulated object. Some examples of forces that may act on the simulated object are spring forces, torsion-k forces, gravity and other natural physics, wind and environmental forces, forces applied in response to motion of a non-simulated object, and the like.

In one example, to let hair object 210 hang down and appear natural in response to gravity (e.g., portions aligned substantially vertical) or to motions of the character's head 200 (e.g., portions aligned with a local acceleration), computer system 100 relaxes the forces attempting to maintain the shape of hair object 210 for those portions of the hair that are near, substantially, or actually aligned with the predetermined orientation. FIG. 4 ends in step 460.

Consider again a hair strand aligned in the vertical direction. While the portion of the hair strand is vertical or substantially vertical, the portion of the hair strand can swing back and forth in a visually pleasing or natural manner. Thus, in various embodiments, computer system 100 provides that simulated objects may be posed by an animator and provided increased freedom of motion when aligned in predetermined directions. Computer system 100 enables the appearance of natural motion to simulated objects, such as hair, fur, and plants.

In some embodiments, computer system 100 provides that when a portion of single hair object 200 of FIG. 2, such as that between hair particles 340 and 350 of FIG. 3, is below a predetermined height, such as being below the position of the reference shape at pose-time, computer system 100 applies one or more forces, such as a lifting force, to act on the set of particles to move the set of particles toward the predetermined height. For example, computer system 100 may generate one or more forces to lift portions of the hair object 210 to make the hair object 210 appear to have a fuller volume as though the top hairs sit on top of other hair that influences the shape and motion of hair object 210. This "z-lofting" of the portions of a simulated object provide visually pleasing modeled, the resulting motion of which are plausible and seemingly realistic, without requiring a human animator to model every hair on the human head.

Figure 5:
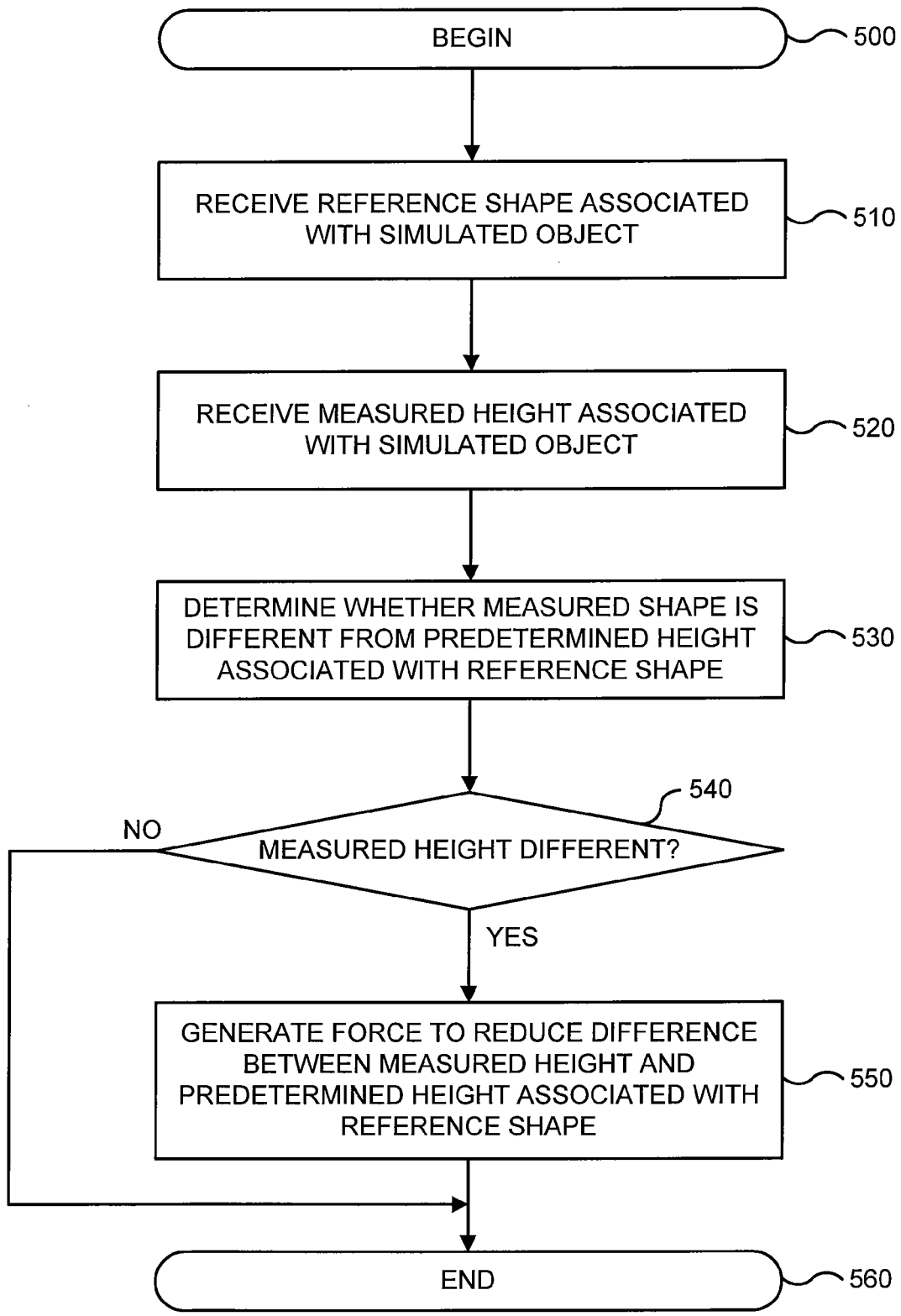
FIG. 5 is a simplified flowchart of a method for simulating objects posed by an animator using z-lofting in one embodiment according to the present invention.

FIG. 5 is a simplified flowchart of a method for simulating objects posed by an animator using z-lofting in one embodiment according to the present invention. FIG. 4 begins in step 500.

In step 510, computer system 100 receives a reference shape associated with a simulated object. Typically, the reference shape includes information, such as height relative to a set location, such as the head of a character object or the floor. In one example, computer system 100 receives the position of each of hair particles 310, 320, 330, 340, 350, and 360 of hair object 210, as indicated with the solid black line.

In step 520, computer system 100 receives a measured height associated with the simulated object. For example, computer system 100 determines the current or actual height of a portion of the simulated object. In one example, computer system 100 receives the position of each of hair particles 310, 320, 330, 340, 350, and 360 of hair object 210, as indicated with the dashed black line.

In step 530, computer system 100 determines whether the measured height is different from the predetermined height associated with the reference shape. For example, computer system 100 may determine that the measured height is below the predetermined height associated with reference shape.

In step 540, if the measured height is different from the predetermined height, in step 550, computer system 100 generates a force to reduce the difference between the measured height and the predetermined height associated with the reference object. For example, computer system 100 may generate a lifting force that brings the current height of the simulated object closer to the predetermined height when the measured height is less than the predetermined height.

In our hair example, in reality, hair styles have volume or fullness because of the number of hairs upon which outer hairs rest. However, it is difficult and often prohibitive to simulated millions of individual hairs. Advantageously, computer system 100 provides lifting forces that attempts to move the simulated positions of the simulated object similar to or toward the posed positions. Thus, in various embodiments, computer system 100 provides increased degrees of freedom for selective portions of simulated objects, while also selectively adjusting forces acting on the simulated objects to approach the desired look and feel as posed by the animator. FIG. 5 ends in step 560.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method performed by one or more computer systems configured for simulating objects, the method comprising:

receiving, at the one or more computer systems, a reference shape associated with an object, wherein motions and positions of the object are determined by computer simulations of the object according to the reference shape and any influences external to the object considered by the computer simulations;

receiving, at the one or more computer systems, information specifying a predetermined orientation;

determining, with one or more processors associated with the one or more computer systems, that the object satisfies the predetermined orientation when a portion of the object is substantially aligned with the predetermined orientation;

modifying, with the one or more processors associated with the one or more computer systems, a first set of forces determined to be acting on the object by a computer simulation according to the reference shape and any influences external to the object considered by the computer simulation while the object satisfies the predetermined orientation by relaxing at least one force in the first set of forces determined to be acting on the portion of the object by the computer simulation when the portion of the object is substantially aligned with the predetermined orientation; and generating, with the one or more processors, information specifying a first position for the object resulting from the modified first set of forces, the first position being different from a second position resulting from the first set of forces determined to be acting on the object by the computer simulation according to the reference shape and any influences external to the object considered by the computer simulation.

2. The method of claim 1 wherein modifying, with the one or more processors associated with the one or more computer systems, the first set of forces determined to be acting on the object by the computer simulation according to the reference shape and any influences external to the object considered by the computer simulation while the object satisfies the predetermined orientation by relaxing at least one force in the first set of forces determined to be acting on the portion of the object by the computer simulation when the portion of the simulated object is substantially aligned with the predetermined orientation comprises relaxing at least one force determined to be acting on the object by the computer simulation according to the reference shape.

3. The method of claim 1 wherein modifying, with the one or more processors associated with the one or more computer systems, the first set of forces determined to be acting on the object by the computer simulation according to the reference shape and any influences external to the object considered by the computer simulation while the object satisfies the predetermined orientation by relaxing at least one force in the first set of forces determined to be acting on the portion of the first object by the computer simulation when the portion of the simulated object is substantially aligned with the predetermined orientation comprises weakening at least one force determined to be acting on the object by the computer simulation in response to a difference between a measured orientation of the object and the predetermined orientation.

4. The method of claim 1 wherein modifying, with the one or more processors associated with the one or more computer systems, the first set of forces determined to be acting on the object by the computer simulation according to the reference shape and any influences external to the object considered by the computer simulation while the object satisfies the predetermined orientation by relaxing at least one force in the first set of forces determined to be acting on the portion of the object by the computer simulation when the portion of the object is substantially aligned with the predetermined orientation comprises adjusting a spring constant associated with a torsion force.

5. The method of claim 1 wherein the predetermined orientation is relative to a gravitational force.

6. The method of claim 1 wherein the predetermined orientation is relative to local acceleration.

7. The method of claim 1 wherein the predetermined orientation is substantially vertical.

8. The method of claim 1 further comprising:
receiving, at the one or more computer systems, a measured height associated with the object;
determining, with the one or more processors associated with the one or more computer systems, that the measured height is less than a predetermined height associated with the reference shape; and
generating, with the one or more processors associated with the one or more computer systems, a second set of forces to act on the object while the measured height is less than the predetermined height to attempt to reduce a difference between the measured height and the predetermined height, the second set of forces being different from the first set of forces determined to be acting on the object by the computer simulation according to the reference shape and any influences external to the object considered by the computer simulation.

9. The method of claim 8 wherein the second set of forces acts on the object to move a current height associated with the object toward the predetermined height.

10. The method of claim 8 wherein the measured height associated with the object is determined relative to a portion of the object.

11. The method of claim 1 wherein the object comprises a hair object.

12. The method of claim 1 wherein the object comprises a linear object.

13. A non-transitory computer-readable medium storing computer-executable code for simulating objects, the computer-readable medium comprising:

code for receiving a reference shape associated with an object, wherein motions and positions of the object are determined by computer simulations of the object according to the reference shape and any influences external to the object considered by the computer simulations;

code for receiving information specifying a predetermined orientation;

code for determining that the object satisfies the predetermined orientation when a portion of the object is substantially aligned with the predetermined orientation;

code for modifying a first set of forces determined to be acting on the object by a computer simulation according to the reference shape and any influences external to the object considered by the computer simulation while the object satisfies the predetermined orientation by relaxing at least one force in the first set of forces determined to be acting on the portion of the object by the computer simulation when the portion of the object is substantially aligned with the predetermined orientation; and code for generating information specifying a first position for the object resulting from the modified first set of forces, the first position being different from a second position resulting from the first set of forces determined to be acting on the object by the computer simulation according to the reference shape and any influences external to the object considered by the computer simulation.

14. The computer-readable medium of claim 13 wherein the code for modifying the first set of forces determined to be acting on the object by the computer simulation according to the reference shape and any influences external to the object considered by the computer simulation while the object satisfies the predetermined orientation by relaxing at least one force in the first set of forces determined to be acting on the portion of the object by the computer simulation when the portion of the object is substantially aligned with the predetermined orientation comprises code for relaxing at least one force determined to be acting on the object by the computer simulation according to the reference shape.

15. The computer-readable medium of claim 13 wherein the code for modifying the first set of forces determined to be acting on the object by the computer simulation according to the reference shape and any influences external to the object considered by the computer simulation while the object satisfies the predetermined orientation by relaxing at least one force in the first set of forces determined to be acting on the portion of the object by the computer simulation when the portion of the object is substantially aligned with the predetermined orientation comprises code for weakening at least one force determined to be acting on the object by the computer simulation in response to a difference between a measured orientation of the object and the predetermined orientation.

16. The computer-readable medium of claim 13 wherein the code for modifying the first set of forces determined to be acting on the object by the computer simulation according to the reference shape and any influences external to the object considered by the computer simulation while the object satisfies the predetermined orientation by relaxing at least one force in the first set of forces determined to be acting on the portion of the first object by the computer simulation when the portion of the simulated object is substantially aligned with the predetermined orientation comprises adjusting a spring constant associated with a torsion force.

17. The computer-readable medium of claim 13 wherein the predetermined orientation is relative to a gravitational force.

18. The computer-readable medium of claim 13 wherein the predetermined orientation is relative to local acceleration.

19. The computer-readable medium of claim 13 wherein the predetermined orientation is substantially vertical.

20. The computer-readable medium of claim 13 further comprising:
- code for receiving a measured height associated with the object;
- code for determining that the measured height is less than a predetermined height associated with the reference shape; and
- code for generating a second set of forces to act on the object while the measured height is less than the predetermined height to attempt to reduce a difference between the measured height and the predetermined height, the second set of forces being different from the first set of forces determined to be acting on the object by the computer simulation according to the reference shape and any influences external to the object considered by the computer simulation.

21. The computer-readable medium of claim 20 wherein the second set of forces acts on the object to move a current height associated with the object toward the predetermined height.

22. The computer readable medium of claim 20 further comprising:
- code for determining the measured height associated with the object relative to a portion of the object.

23. The computer-readable medium of claim 13 wherein the object comprises a hair object.

24. The computer-readable medium of claim 13 wherein the object comprises a linear object.

25. A system for simulating objects, the system comprising:
- a processor; and
- a memory coupled to the processor, the memory configured to store a set of instructions which when executed by the processor configure the processor to:
  - receive a reference shape associated with an object, wherein motions and positions of the object are determined by computer simulations of the object according to the reference shape and any influences external to the object considered by the computer simulations;
  - receive information specifying a predetermined orientation;
  - determine that the object satisfies the predetermined orientation when a portion of the simulated object is substantially aligned with the predetermined orientation;
  - modify a first set of forces determined to be acting on the object by a computer simulation according to the reference shape and any influences external to the object considered by the computer simulation while the object satisfies the predetermined orientation by relaxing at least one force in the first set of forces determined to be acting on the portion of the object by the computer simulation when the portion of the object is substantially aligned with the predetermined orientation; and
- generate information specifying a first position for the object resulting from the modified first set of forces, the first position being different from a second position resulting from the first set of forces determined to be acting on the object by the computer simulation according to the reference shape and any influences external to the object considered by the computer simulation.

26. The system of claim 25 wherein the processor is configured to relax at least one first force determined to be acting on the object by the computer simulation according to the reference shape to modify the first set of forces determined to be acting on the object by the computer simulation according to the reference shape and any influences external to the object considered by the computer simulation while the object satisfies the predetermined orientation by relaxing at least one force in the first set of forces determined to be acting on the portion of the object by the computer simulation when the portion of the object is substantially aligned with the predetermined orientation.

27. The system of claim 25 wherein the processor is configured to weaken at least one the first force determined to be acting on the object by the computer simulation in response to a difference between a measured orientation of the object and the predetermined orientation to modify the first set of forces determined to be acting on the object by the computer simulation according to the reference shape and any influences external to the object considered by the computer simulation while the object satisfies the predetermined orientation by relaxing at least one force in the first set of forces determined to be acting on the portion of the object by the computer simulation when the portion of the object is substantially aligned with the predetermined orientation.

28. The system of claim 25 wherein the processor is configured to adjust a spring constant associated with a torsion force to modify the first set of forces determined to be acting on the object by the computer simulation according to the reference shape and any influences external to the object considered by the computer simulation while the object satisfies the predetermined orientation by relaxing at least one force in the first set of forces determined to be acting on the portion of the first object by the computer simulation when the portion of the simulated object is substantially aligned with the predetermined orientation.

29. The system of claim 25 wherein the predetermined orientation is relative to a gravitational force.

30. The system of claim 25 wherein the predetermined orientation is relative to local acceleration.

31. The system of claim 25 wherein the predetermined orientation is substantially vertical.

32. The system of claim 25 wherein the processor is further configured to:
- receive a measured height associated with the object;
- determine that the measured height is less than a predetermined height associated with the reference shape, and
- generate a second set of forces to act on the object while the measured height is less than the predetermined height to attempt to reduce a difference between the measured height and the predetermined height, the second set of forces being different from the first set of forces determined to be acting on the object by the computer simulation according to the reference shape and any influences external to the object considered by the computer simulation.

33. The system of claim 32 wherein the processor is configured to generate the second set of forces to act on the object to move a current height associated with the object toward the predetermined height.

34. The system of claim 32 wherein the processor is configured to determine the measured height associated with the object relative to a portion of the object.

35. The system of claim 25 wherein the object comprises a hair object.

36. The system of claim 25 wherein the object comprises a linear object.

* * * * *